March 7, 1967 R. W. KENNY ETAL 3,307,470
EXHAUST CONDUIT
Filed Oct. 12, 1964
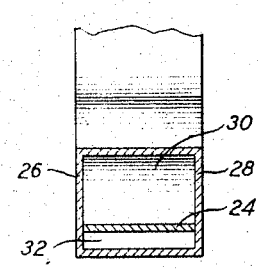
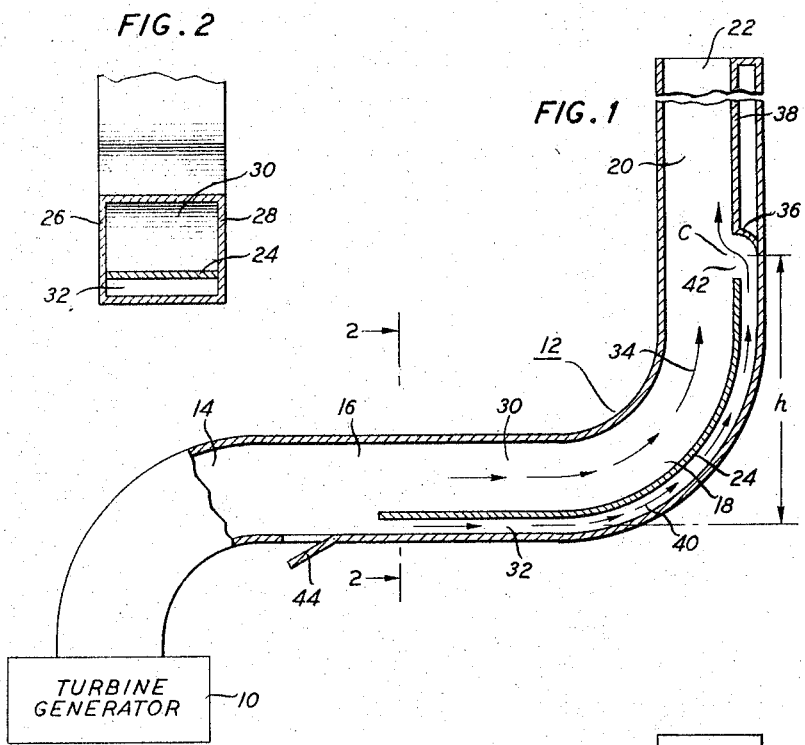
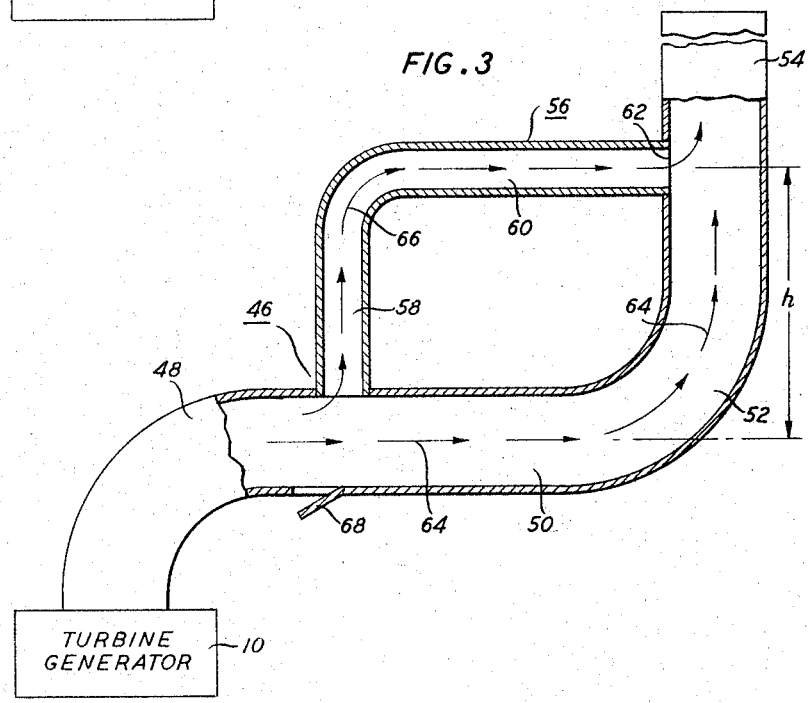
INVENTORS: R. W. KENNY
P. J. TORPEY
BY: Leo Stanger
ATTORNEY

United States Patent Office 3,307,470
Patented Mar. 7, 1967

3,307,470
EXHAUST CONDUIT
Robert W. Kenny, Morristown, and Paul J. Torpey, Parsippany, N.J., assignors to Bell Telephone Laboratories, Incorporated, New York, N.Y., a corporation of New York
Filed Oct. 12, 1964, Ser. No. 403,283
11 Claims. (Cl. 98—58)

This invention relates to gas conduits and particularly to conduits for carrying off exhaust gases from turbine generators or the like.

Such exhaust conduits preferably constitute vertical stacks with horizontal outlet openings. The vertical orientation minimizes impingement of hot gas upon objects surrounding the generator and also minimizes outlet noise. The horizontal opening obviates the effect of sporadic back pressures resulting from sudden gusts of wind in the direction of the opening. However, snowfall entering the vertical stack through the horizontal opening has a tendency to accumulate and eventually clog the conduit with snow, thereby causing the turbine generator to malfunction.

Attempts have been made to overcome these difficulties by providing the horizontal opening with a covering such as an elevated cap. However, this results in continuous high engine back pressure, unsightly appearance, incomplete protection, and downward acoustic reflection.

A general object of the invention is to improve gas conduits. A more particular object of the invention is to orient and assemble the exhaust conduit so as to minimize gas impingement and noise and at the same time avoid snow clogging while nevertheless also preventing the effects of horizontal wind gusts.

Another object of the invention is to prevent the effects of snowfall in vertically oriented exhaust conduits having horizontal openings.

According to the invention these objects are achieved by passing some exhaust gases through a principal path that comprises a vertical conduit section connecting at its base to a horizontal conduit section so as to form an elbow, and passing other exhaust gases through a shunt path comprising a shunt duct which extends from the horizontal section and intersects the vertical section angularly. A water drain in the horizontal section passes off any melted snow that has accumulated from the vertical section.

According to a more particular feature of the invention, the shunt duct comprises a shunt elbow having a vertical path intersecting the horizontal section and a horizontal path intersecting the vertical section. According to still another feature of the invention, the shunt duct constitutes a shunt elbow within the elbow formed by the principal exhaust but terminates in a vertical opening that connects it to the vertical stack and is formed by a horizontal covering adjacent to the vertical opening.

These and other features of the invention, broader and more specific, are pointed out in the claims. Other objects and advantages of the invention will become obvious from the following description when read in light of the accompanying drawing, wherein:

FIG. 1 is a sectional view, partially schematic, of an exhaust gas conduit embodying features of the invention;
FIG. 2 is a section II—II of FIG. 1; and
FIG. 3 is a sectional and partially schematic view of another gas conduit embodying features of the invention.

In FIG. 1 a turbine generator 10 exhausts hot gases into an exhaust conduit or duct generally designated 12. The lower section 16 of the conduit includes an elbow 14 that conducts the gases upwardly and then horizontally from the generator 10. A horizontal duct section then guides the gases under slight pressure from the turbine generator 10 horizontally through an upwardly curving elbow 18 to a vertical stack 20 having a horizontal outlet opening 22.

The conduit 12 possesses a rectangular cross-section as illustrated in FIG. 2. A plate 24 extending between the vertical side walls 26 and 28 of the conduit 12 extends longitudinally within the conduit from a portion of the section 16 through the elbow 18 to a portion of the stack 20. This plate 24 thus divides the conduit into a larger principal path 30 and a narrower shunt path 32.

Gases normally flow through both the principal path and the shunt path. The gases in the principal path flow upwardly as shown by the arrows 34. An angular baffle 36 over the top end of the shunt path 32 joins with a vertical baffle plate 38 that is aligned with the plate 24 and also extends between the walls 26 and 28 on the conduit 12. The baffle 36 also extends entirely across the conduit 12 between its side walls 26 and 28. Gases through the shunt path 32 travel as designated by the arrows 40 until they are shunted aside by the baffle plate 36 and join the gases that have traveled along the principal path 30. The opening 42 at the end of the shunt path where it joins the principal path is substantially vertical.

If snow should fall down the vertical stack 20 through the outlet opening 22 only minimal amounts would enter the opening 42 formed by the baffle plate 36, the vertical baffle plate 38, and the dividing plate 24. Most of the snow would descend and accumulate within the principal path in the elbow 18. In the event that the snow should clog the elbow, exhaust gases could still pass out of the conduit 12 through the shunt path 32. As the hot gases melt the snow in the principal path 30, the resulting water drips toward a water drain 44 at the bottom of the horizontal section 16.

Thus, the conduit 12 according to FIG. 1 is able to operate despite adverse snow conditions due to the vertical opening 42 that the shunt path 32 forms with the principal path 30. Under normal circumstances, the constriction presented by the conduit 12 is comparatively wide and provides for rapid exhaust. While back pressure due to some constriction exists when snow clogs the principal path 30, the conduit 12 is still maintained open by the shunt path 32. This compares favorably with systems that cap the vertical stack 20 to protect it from snow but thereby reduce the outlet opening and increase the outlet pressure at all times.

In FIG. 3 the turbine generator 10 again exhausts hot gases through a conduit 46 of rectangular cross-section, whose principal path corresponds to the main outlines of the conduit 12. Here gases pass through an elbow 48 that turns them from the vertical to the horizontal direction, through a horizontal duct section 50, an elbow 52 that turns the gases upwardly, and an outgoing stack 54 having a horizontal outlet opening. A shunt path generally designated 56 comprises an upstanding duct 58 that intersects the horizontal section 50 at its top and a communicating horizontal duct 60 that intersects the vertical stack 54 in a vertical opening 62. Hot gases under pressure from the turbine generator 10 flow through the principal path along the arrows designated 64 and through the shunt path 56 along the path indicated by the arrows 66. Thus, the gases part near the intersection of the horizontal portion 50 and the upstanding duct 58. They meet again at the vertical opening 62.

Should snow descend the vertical stack it would accumulate in the vicinity of the elbow 52 and obstruct the principal path. However, the vertical opening 62 prevents substantial accumulation of snow in the shunt path 56, and, therefore, gases can always pass through the shunt path. The distance between the elbow 52 and the intersection of the upstanding portion 58 with the horizontal section 50 is made sufficiently large so that accumulation of the snow at the latter intersection is avoided. The vertical distance *h* in both FIG. 1 and FIG. 2 between the vertical start and end of the shunt path is also made larger than the snow accumulation expected within the principal path.

A water drain 68 located in the horizontal duct section provides escape for melted snow.

According to the invention, the conduits and ducts 12 and 46 may have cross-sections other than rectangular, such as circular cross-sections. Also according to the invention, the shunt path 56 may comprise a longitudinally straight duct extending angularly from the intersection with the section 50 to its intersection with the stack 54.

While embodiments of the invention have been described in detail, it will be obvious to those skilled in the art that the invention may be embodied otherwise without departing from its spirit and scope.

What is claimed is:

1. A conduit for exhaust gases from a source comprising, principal duct means having a horizontal section and a vertical outlet stack forming an elbow with said horizontal section, a shunt duct extending from the horizontal section and angularly intersecting the stack, and water drain means in the horizontal section.

2. A conduit for fluid flowing from a source comprising horizontal duct means communicating with said source, upstanding duct means communicating with said horizontal duct means and forming an elbow therewith, shunt path duct means communicating with said horizontal duct means and angularly intersecting said upstanding duct means, and a water drain in said horizontal duct means.

3. A conduit for fluid flowing from a source comprising horizontal duct means communicating with said source, upstanding duct means communicating with said horizontal duct means and forming an elbow therewith, shunt path duct means communicating with said horizontal duct means and angularly intersecting said upstanding duct means, and a water drain in said horizontal duct means, said upstanding duct means terminating in a horizontal opening.

4. A conduit for exhaust gases from a source comprising principal duct means having a horizontal section and a vertical outlet stack forming an elbow with said horizontal section, shunt path duct means extending from the horizontal section and angularly intersecting the stack, and water drain means in the horizontal section, said upstanding duct means forming with said angularly intersecting shunt path duct means a vertical opening.

5. A conduit for fluid flowing from a source comprising horizontal duct means communicating with said source, upstanding duct means communicating with said horizontal duct means and forming an elbow therewith, shunt path duct means communicating with said horizontal duct means and angularly intersecting said upstanding duct means, and a water drain in said horizontal duct means, said upstanding duct means forming with said angularly intersecting shunt path duct means a vertical opening.

6. A conduit for fluid flowing from a source comprising horizontal duct means communicating with said source, upstanding duct means communicating with said horizontal duct means and forming an elbow therewith, shunt path duct means communicating with said horizontal duct means and angularly intersecting said upstanding duct means, and a water drain in said horizontal duct means, said shunt path duct means having an upper covering near said upstanding duct means for covering the interior of said shunt path duct means from downward fall of materials, and for directing the gases therein into said upstanding duct means.

7. A conduit for fluid flowing from a source comprising horizontal duct means communicating with said source, upstanding duct means communicating with said horizontal duct means and forming an elbow therewith, shunt path duct means communicating with said horizontal duct means and angularly intersecting said upstanding duct means, said shunt path duct means being formed parallel to said elbow, and a water drain in said horizontal duct means.

8. A conduit for fluid flowing from a source comprising horizontal duct means communicating with said source, upstanding duct means communicating with said horizontal duct means and forming an elbow therewith, shunt path duct means communicating with said horizontal duct means and angularly intersecting said upstanding duct means, said shunt path duct means being formed parallel to said elbow, and a water drain in said horizontal duct means, said shunt path duct means comprising a plate extending through said elbow and dividing said elbow into two portions, said shunt path duct means having upper covering means above the end of said plate to form a vertical intersection with said upstanding duct means and for covering the interior of said shunt path duct means from downward fall of materials.

9. A conduit for fluid flowing from a source comprising horizontal duct means communicating with said source, upstanding duct means communicating with said horizontal duct means and forming an elbow therewith, shunt path duct means communicating with said horizontal duct means and angularly intersecting said upstanding duct means, said shunt path duct means being formed parallel to said elbow, and a water drain in said horizontal duct means, said shunt path duct means including a vertical section intersecting said horizontal duct means and a horizontal section communicating with said vertical section and intersecting said upstanding duct means in a vertical joint.

10. A conduit for gases expelled by a source comprising a horizontal duct, an elbow, and a vertical duct all communicating with each other, a divider plate dividing the interior of said elbow into two separate portions, a baffle plate above the end of said divider plate for guiding gases from one of the portions into the other and forming with the divider plate a vertical opening, and a water drain in the horizontal duct.

11. A conduit for gases expelled by a source comprising a horizontal duct, an elbow, and a vertical duct all communicating with each other while forming a principal path, a shunt path including a vertical member intersecting with the horizontal duct and a horizontal member intersecting with the vertical duct and forming therewith a vertical opening, and a water drain in the horizontal duct.

References Cited by the Examiner
UNITED STATES PATENTS

| | | | |
|---|---|---|---|
| 2,121,319 | 6/1938 | Fluor, Jr. et al. | 138—114 X |
| 2,630,748 | 3/1953 | Brockelsby | 98—60 |
| 2,887,032 | 5/1959 | Wachter, Jr. | 98—60 |
| 3,187,936 | 6/1965 | Downing | 138—114 X |

M. CARY NELSON, *Primary Examiner.*

S. SCOTT, *Assistant Examiner.*